United States Patent
Tanabe et al.

(10) Patent No.: US 8,089,484 B2
(45) Date of Patent: Jan. 3, 2012

(54) VIDEO GAME PROGRAM AND VIDEO GAME DEVICE FOR GENERATING AN ATTRIBUTE STATUS IMAGE

(75) Inventors: Kensuke Tanabe, Kyoto (JP); Nobuyuki Inoue, Musashino (JP); Takeo Ohin, Musashino (JP); Hiroki Matsuura, Musashino (JP)

(73) Assignee: Nintendo Co., Ltd., Kyoto (JP)

( * ) Notice: Subject to any disclaimer, the term of this patent is extended or adjusted under 35 U.S.C. 154(b) by 762 days.

(21) Appl. No.: 11/429,264

(22) Filed: May 8, 2006

(65) Prior Publication Data

US 2007/0076015 A1     Apr. 5, 2007

(30) Foreign Application Priority Data

Oct. 4, 2005   (JP) ................................. 2005-291636

(51) Int. Cl.
    *G06T 13/00*     (2011.01)
(52) U.S. Cl. ..................................................... 345/473
(58) Field of Classification Search .................. None
See application file for complete search history.

(56) References Cited

U.S. PATENT DOCUMENTS

| | | | |
|---|---|---|---|
| 6,210,273 B1 * | 4/2001 | Matsuno | 463/8 |
| 6,409,604 B1 * | 6/2002 | Matsuno | 463/43 |
| 6,439,998 B1 * | 8/2002 | Itou | 463/43 |
| 6,585,599 B1 * | 7/2003 | Horigami et al. | 463/43 |
| 6,656,051 B2 * | 12/2003 | Ishii et al. | 463/43 |
| 2004/0143852 A1 * | 7/2004 | Meyers | 725/133 |
| 2004/0259613 A1 * | 12/2004 | Machida | 463/1 |
| 2005/0176502 A1 * | 8/2005 | Nishimura et al. | 463/31 |

OTHER PUBLICATIONS

Code Age Commanders—Tsugumono Tsugarerumono-, Dengeki Play Station, vol. 323, Media Works, Sep. 9, 2005, vol. 11, No. 31, p. 89, with partial English translation, 5 pages.
Qbist Incorporated, Tomoharu Takeda and three others, The Play Station Books Black/Matrix Crosss Official Guide Book, Softbank Publishing Incorporated, Dec. 25, 2000, first edition, p. 43, p. 51, with partial English translation, 7 pages.
Isao Inoue, "Pocket Monster Blue—Hisshou Kouryakubon", Futabasha Publishers, Ltd., Mar. 25, 1997, pp. 10-11.
Koichi Hamamura, "Shukan Famitsu 8.20 extra issue—Ogre Battle 64", ASCII Corporation, Aug. 20, 1999, pp. 36-38.

* cited by examiner

*Primary Examiner* — Said Broome
(74) *Attorney, Agent, or Firm* — Nixon & Vanderhye P.C.

(57) ABSTRACT

Displayed on a first LCD 11 are a "fire" planet 40*a*, a "wood" planet 40*b*; an "earth" planet 40*c*, a "wind" planet 40*d* and a "water" planet 40*e*, each traveling along an orbit by a unique orbital period. While an attribute symbol is traveling through an active zone that is associated with the attribute symbol, the status of the attribute represented by the attribute symbol is active. An attribute being active affects the space attribute, which is the attribute of a particular space in the game world. The space attribute affects the ability parameters of characters of the same attribute. Thus, it is possible to enrich the strategic aspect of a video game using characters' attributes.

24 Claims, 11 Drawing Sheets

COMMON ACTIVE ZONE

VIDEO GAME PROGRAM AND VIDEO GAME DEVICE FOR GENERATING AN ATTRIBUTE STATUS IMAGE

CROSS REFERENCE TO RELATED APPLICATION

The disclosure of Japanese Patent Application No. 2005-291636, filed Oct. 4, 2005, is incorporated herein by reference.

BACKGROUND

1. Field

Non-limiting example embodiments of the present invention relates to a video game program and a video game device and, more particularly, to a video game program and a video game device, in which a game proceeds while taking into consideration attributes of characters, spells, etc., in a battle of a role-playing game, for example.

2. Description of the Background Art

Video games of a genre called "role-playing games" are well known in the art. In a video game of this type, it is typical that characters and items are assigned various attributes, and the attack power and the damage points of a character may be increased depending on the attribute of the character with respect to that of an opponent character.

In a video game described in Non-Patent Document 1 (Isao Inoue, "Pocket Monster Blue—Hisshou Kouryakubon", Futabasha Publishers, Ltd., Mar. 25, 1997, pp. 10-11), characters called "pokemons" are each assigned one of several "type" attributes including "fire", "water", etc., and the type attribute of a character being engaged in a battle affects the battle in favor of or against the character depending on the type attribute with respect to that of the opponent character.

In a video game described in Non-Patent Document 2 (Koichi Hamamura, "Shukan Famitsu 8.20 extra issue—Ogre Battle 64", ASCII Corporation, Aug. 20, 1999, pp. 36-38), characters are each assigned one of several "element" attributes, and an element attribute gives varied levels of influence on a battle depending on its correlation with other element attributes. Each equipment item is also assigned an element attribute, which may possibly lower the strength of the character depending on its correlation with the element attribute of the character, thus giving an additional strategic element to the selection of equipment. Each character is also assigned a personality-related attribute called "alignment", which changes through battles in the game. How the game progresses is also affected by the alignment of each character with respect to those of other characters.

In the video games of Non-Patent Documents 1 and 2, a character's attribute does not change in real time. Therefore, even though a player needs to play the game while taking attributes into consideration, the gameplay will become monotonous for the player once the player remembers the attributes of the various characters.

Although the video game of Non-Patent Document 2 employs an attribute called "alignment" that changes as the game progresses, the change in the alignment attribute is based on the tendency of instructions inputted by the player, and therefore will not introduce such a strategic element that would require the player to input an appropriate instruction according to an attribute changing in real time.

SUMMARY

Therefore, an aspect of example embodiments of the present invention is to provide a video game using characters' attributes, which incorporates a novel gameplay.

Another aspect of example embodiments of the present invention is to provide a video game using characters' attributes, which gives the player an opportunity to work out a new strategy, thus enhancing the playability of the video game.

Still another aspect of example embodiments of the present invention is to provide a video game using characters' attributes, in which the game process will not become monotonous or boring for the player.

Example embodiments of the present invention have the following features to attain the aspects mentioned above. Note that reference numerals and figure numbers are shown in parentheses below for assisting the reader in finding corresponding components in the drawings to facilitate the understanding of example embodiments of the present invention. It is understood that these parenthetic expressions are in no way intended to restrict the scope of the invention.

Example embodiments of the present invention provides a computer-readable storage medium storing a video game program to be executed by a video game device including display means (11, 12), control means (14, 15) and storage means (24).

The video game program instructs a computer (21) of the video game device to function as attribute status changing means, attribute status display control means, space attribute determining means, attribute comparison means, character ability changing means, and game process means.

The attribute status changing means is means for switching a status of each of a plurality of predetermined attributes between active and inactive in real time and for storing the status of each attribute in the storage means (S16). The attribute status display control means is means for producing an attribute status barometer image and displaying the attribute status barometer image on the display means, wherein the attribute status barometer image represents whether or not a status of each attribute is currently being active and an amount of time needed before an inactive attribute will next become active (which may be an approximate representation of the time) (S20). The space attribute determining means is means for determining a space attribute according to an attribute currently being active and storing the space attribute in the storage means (S18). The attribute comparison means is means for comparing an attribute of a character in a game world with the space attribute determined by the space attribute determining means (S50). The character ability changing means is means for changing an ability parameter of the character based on a result of the comparison by the attribute comparison means (S52). The game process means is means for performing a game process using the ability parameter, which has been changed by the character ability changing means, based on an instruction inputted by a player through the control means (S54). Note that "attributes of a character" are not limited to those of the character itself, but may also include those of magic spells cast by the character, and those of weapons used by the character to attack opponent characters.

In a first example embodiment of the computer-readable storage medium of the present invention, a period by which the status of each attribute is switched by the attribute status changing means from inactive to active is different from one attribute to another.

Figure 3:
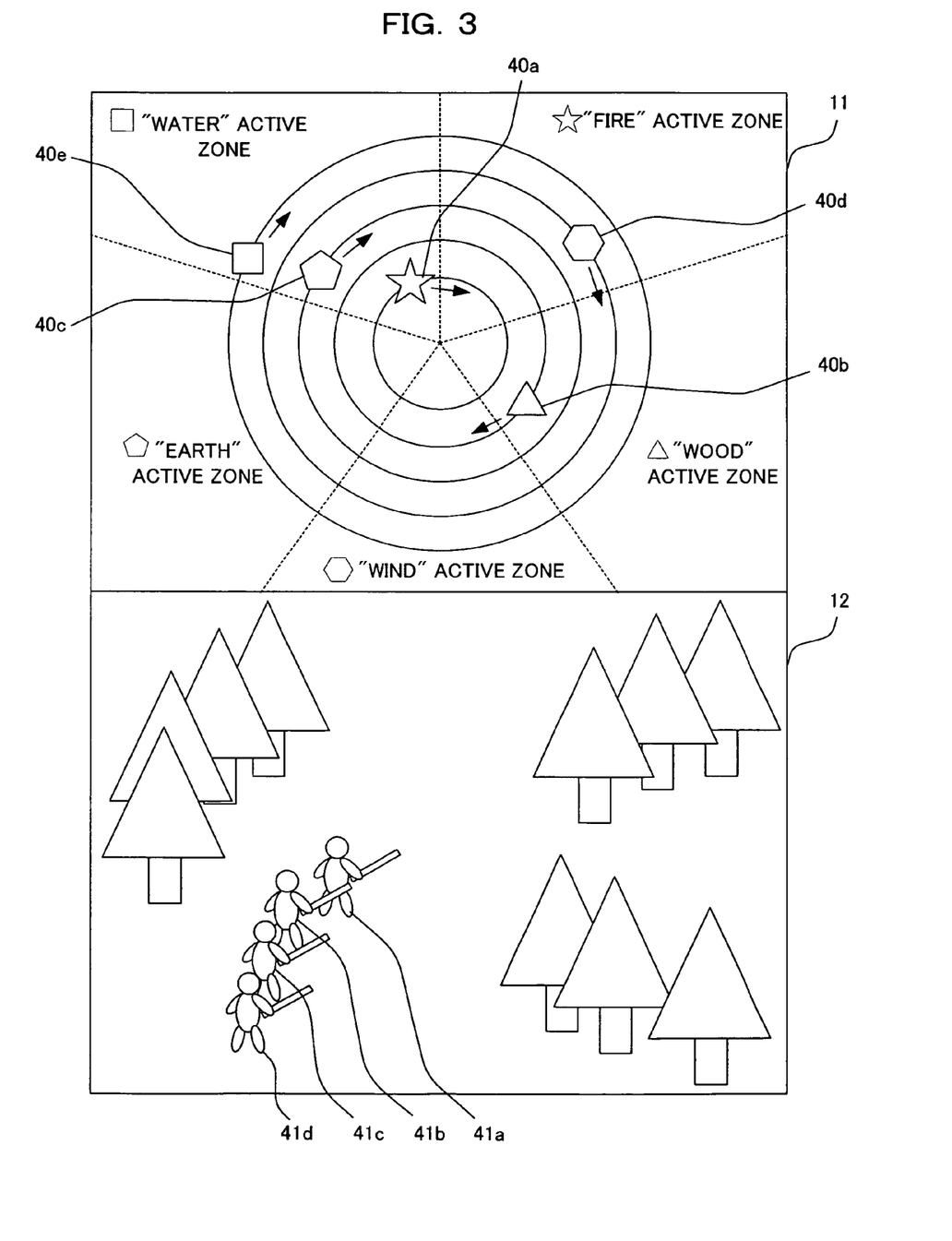
FIG. 3 shows an exemplary game screen in the traveling mode.
Figure 10:
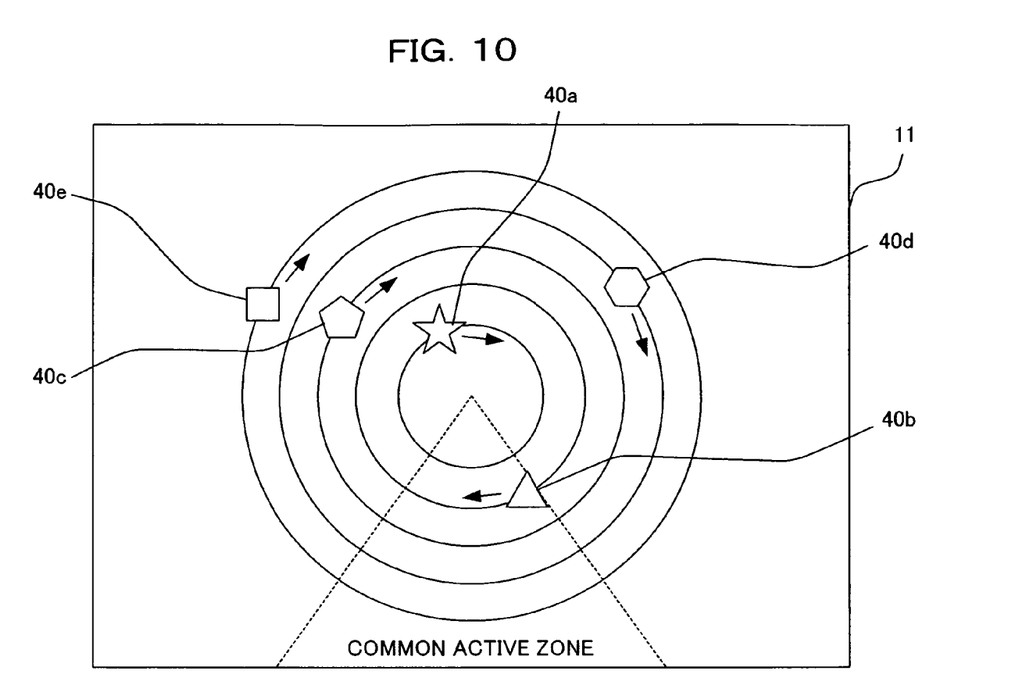
FIG. 10 shows a variation of an attribute status barometer image.

In a second example embodiment of the computer-readable storage medium of the present invention, the attribute status display control means produces an attribute status barometer image and displays the attribute status barometer image on the display means, wherein the attribute status barometer image represents whether or not a status of each attribute is currently being active and an amount of time needed before an inactive attribute will next become active, in terms of positions at which attribute symbols (40*a* to 40*e*) each associated with one attribute are displayed (FIG. 3, FIG. 10).

In a third example embodiment of the computer-readable storage medium of the present invention, the attribute status display control means produces an attribute status barometer image and displays the attribute status barometer image on the display means, wherein each attribute symbol moves so that the attribute symbol is located within an active zone while a status of the attribute associated with the attribute symbol is being active (FIG. 3, FIG. 10).

In a fourth example embodiment of the computer-readable storage medium of the present invention, a position of the active zone is different for each attribute symbol; and the attribute status display control means produces an attribute status barometer image and displays the attribute status barometer image on the display means, wherein each attribute symbol moves so that the attribute symbol is located within an active zone for the attribute symbol while a status of the attribute associated with the attribute symbol is being active whereas the attribute symbol is located within an active zone for another attribute symbol while the status of the attribute associated with the attribute symbol is being inactive (FIG. 3).

In a fifth example embodiment of the computer-readable storage medium of the present invention, the game process means performs a game process in which a plurality of characters, including a player character (41*a* to 41*d*) and an enemy character (42), are involved in a battle against each other; the character ability changing means changes an ability parameter of each character so as to increase an attack power of the character based on a result of the comparison by the attribute comparison means; the attribute comparison means compares an attribute of each character with the space attribute determined by the space attribute determining means; and the character ability changing means changes an ability parameter of each character so as to increase an attack power of the character if an attribute of the character corresponds to the space attribute based on a result of the comparison by the attribute comparison means. Note that "the attack power of a character" is not limited to the attack power (muscular strength) of the character itself, but may also include the power of magic spells cast by the character, and the power of weapons used by the character to attack opponent characters.

A video game device of example embodiments of the present invention includes: display means for displaying a game image; control means to be controlled by a player; storage means for storing data for a game process; attribute status changing means for switching a status of each of a plurality of predetermined attributes between active and inactive in real time and for storing the status of each attribute in the storage means; attribute status display control means for producing an attribute status barometer image and displaying the attribute status barometer image on the display means, wherein the attribute status barometer image represents whether or not a status of each attribute is currently being active and an amount of time needed before an inactive attribute will next become active; space attribute determining means for determining a space attribute according to an attribute currently being active and storing the space attribute in the storage means; attribute comparison means for comparing an attribute of a character in a game world with the space attribute determined by the space attribute determining means; character ability changing means for changing an ability parameter of the character based on a result of the comparison by the attribute comparison means; and game process means for performing a game process using the ability parameter, which has been changed by the character ability changing means, based on an instruction inputted by a player through the control means.

In a first example embodiment of the video game program of the present invention, the game process means performs a game process in which a plurality of characters, including a player character and an enemy character, are involved in a battle against each other; the character ability changing means changes an ability parameter of each character so as to increase an attack power of the character based on a result of the comparison by the attribute comparison means; the attribute comparison means compares an attribute of each character with the space attribute determined by the space attribute determining means; and the character ability changing means changes an ability parameter of each character so as to increase an attack power of the character if an attribute of the character corresponds to the space attribute based on a result of the comparison by the attribute comparison means.

With the video game program and the video game device of example embodiments of the present invention, the space attribute, which affects the ability parameters of each character, changes in real time. Therefore, it is possible to enrich the strategic aspect of a video game that is played while taking attributes into consideration. The player can look at the attribute status barometer image to perceive the amount of time needed before an attribute will next become active, based on which the player can make a strategic decision, e.g., a decision to remain still in view of the space attribute being about to switch to an intended attribute. This enriches the strategic aspect of the present video game.

In the first example embodiment of the video game program of the present invention, the order in which different attributes become active will not be fixed, which prevents the transitions of the space attribute from becoming monotonous.

In the second example embodiment of the video game program of the present invention, the player can easily determine, based on the positions at which attribute symbols are displayed, which attribute is currently being active and about when an inactive attribute will become active.

In the third example embodiment of the video game program of the present invention, the player can clearly determine whether or not an attribute is being active by checking whether the attribute symbol associated with the attribute is within the active zone thereof. Moreover, the player can clearly determine about when an inactive attribute will become active based on how close the associated attribute symbol is to the active zone thereof.

In the fourth example embodiment of the video game program of the present invention, the position of the active zone is different for each attribute symbol. Therefore, the player is prevented from too easily determining, at a glance, which attribute is currently being active and about when an inactive attribute will become active. This enhances the playability of the video game.

The fifth example embodiment of the video game program of the present invention is directed to a video game in which the player controls player characters in a battle, wherein the attack power of a character having an attribute corresponding to the space attribute is increased. Therefore, the player can enjoy strategic battles while taking into consideration transitions of the space attribute.

These and other features, aspects and advantages of non-limiting example embodiments of the present invention will become more apparent from the following detailed description of example embodiments of the present invention when taken in conjunction with the accompanying drawings.

DESCRIPTION OF THE NON-LIMITING EXAMPLE EMBODIMENTS

A configuration and an operation of a video game device according to an example embodiment of the present invention will now be described.

Figure 1:
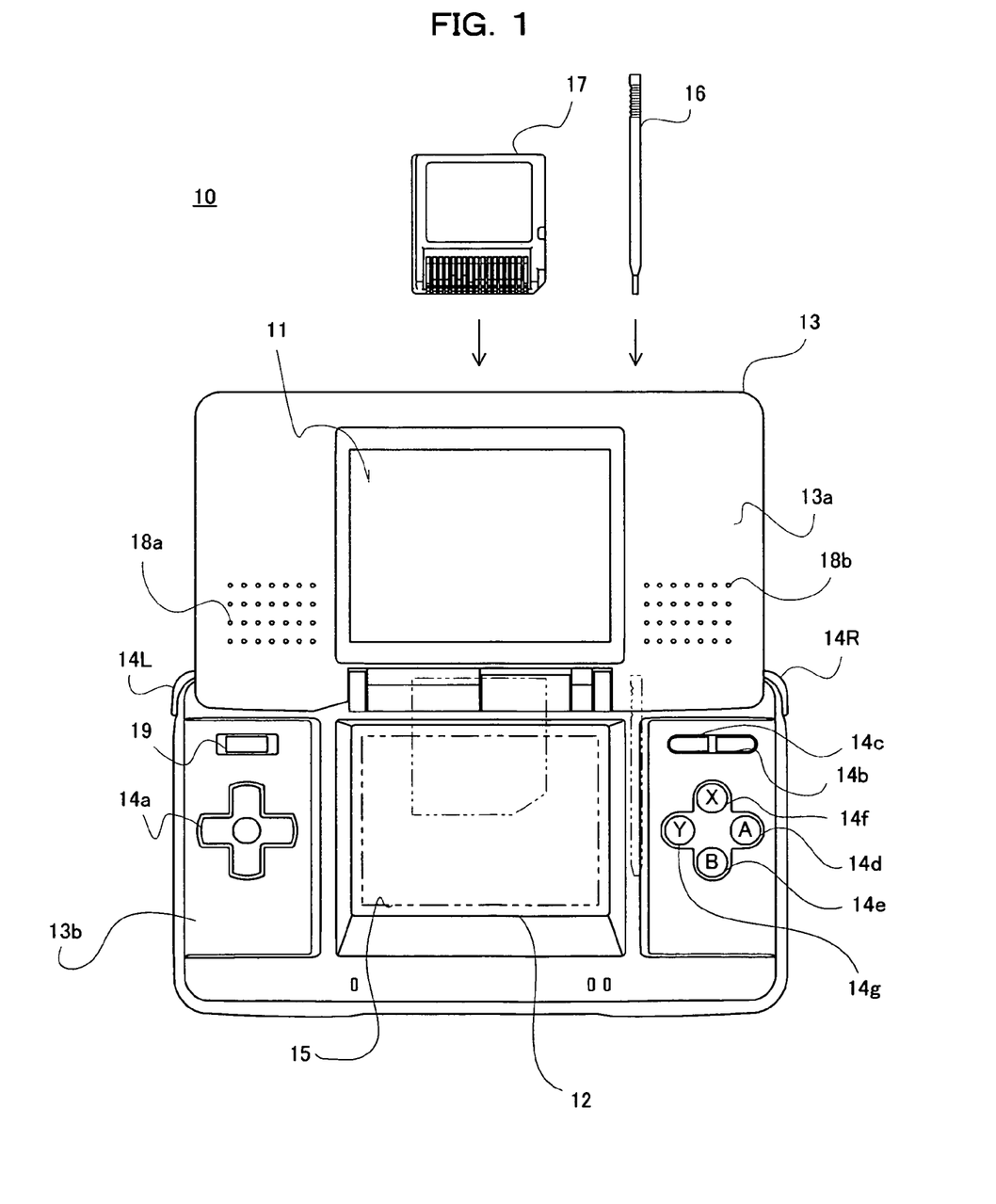
FIG. 1 shows an external view of a video game device 10 according to an example embodiment of the present invention.

FIG. 1 shows an external view of a video game device 10 according to the example embodiment of the present invention. Referring to FIG. 1, the video game device 10 includes a first LCD (Liquid Crystal Display) 11 and a second LCD 12. A housing 13 includes an upper housing 13*a* accommodating the first LCD 11, and a lower housing 13*b* accommodating the second LCD 12. The first LCD 11 and the second LCD 12 both have a resolution of 256.times.192 dots. While LCDs are used in the present embodiment, the display device may be of any other suitable type, e.g., an EL (Electro Luminescence) display device. Moreover, the resolution of the first LCD 11 and the second LCD 12 is not limited to the particular resolution used herein.

The upper housing 13*a* includes sound slits 18*a* and 18*b* therein for allowing the sound from a pair of speakers (30*a* and 30*b* in FIG. 2) to be described later to pass therethrough.

The lower housing 13*b* includes a set of input devices, including a cross-shaped switch 14*a*, a start switch 14*b*, a select switch 14*c*, an A button 14*d*, a B button 14*e*, an X button 14*f*, a Y button 14*g*, an L button 14L and an R button 14R. Another input device is a touch panel 15 attached on the screen of the second LCD 12. The lower housing 13*b* includes a power switch 19 and slots for accommodating a memory card 17 and a stylus 16.

The touch panel 15 may be any of various types of touch-sensitive panels, including a resistive film touch panel, an optical (infrared) touch panel and a capacitance-coupling touch panel. The touch panel 15 is capable of outputting position data corresponding to the contact point on the surface thereof, at which it is being touched with the stylus 16. While it is assumed herein that the player uses the stylus 16 to operate the touch panel 15, it is understood that the touch panel 15 may be operated with a pen (stylus pen) or a fingertip instead of the stylus 16. In the present embodiment, the touch panel 15 has a resolution (detection precision) of 256×192 dots, which is equal to the resolution of the second LCD 12. Note however that it is not necessary that the resolution of the touch panel 15 is equal to that of the second LCD 12.

The memory card 17 is a storage medium storing a video game program, and is received by the slot in the lower housing 13*b*.

Figure 2:
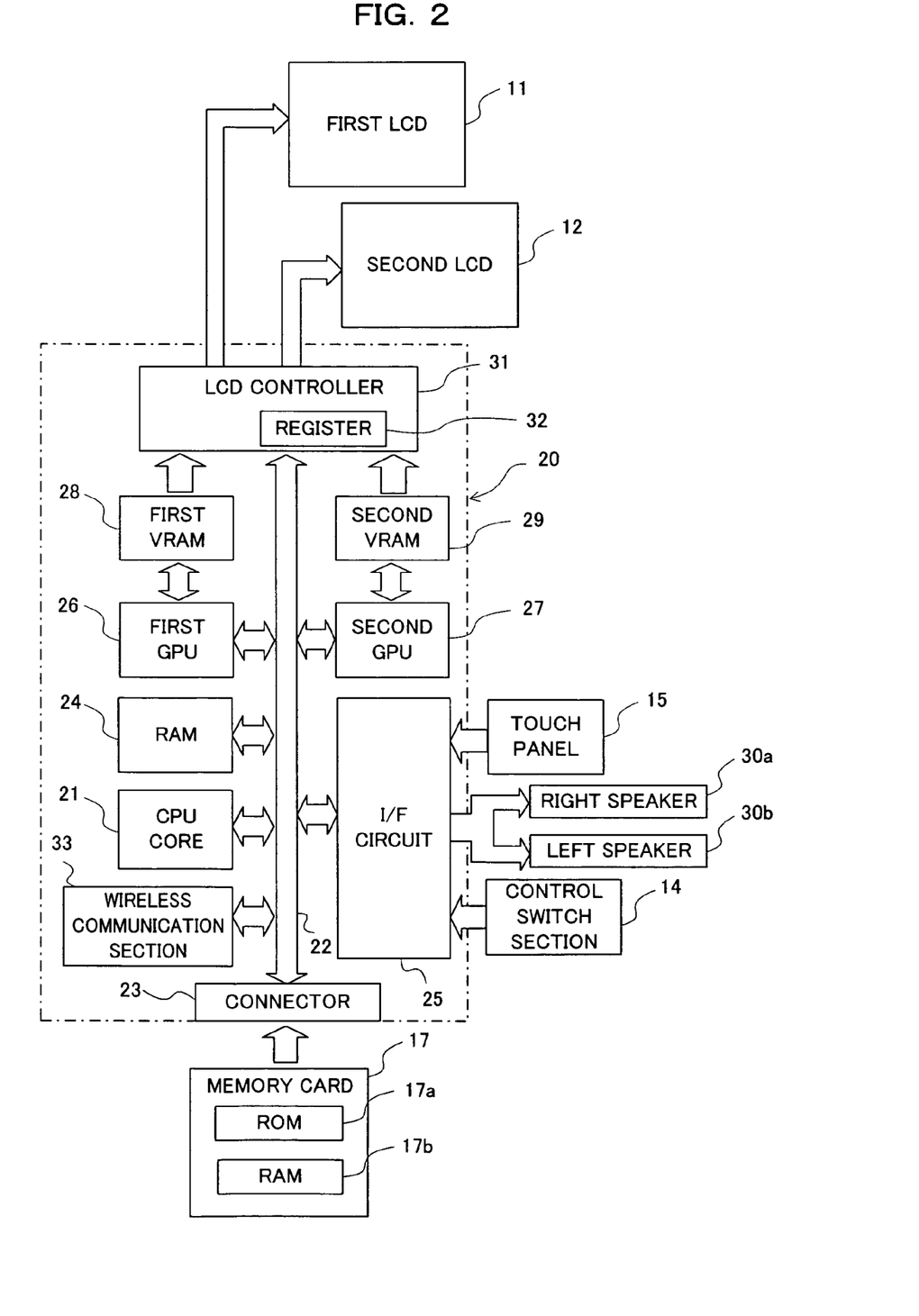
FIG. 2 shows an internal configuration of the video game device 10.

Referring now to FIG. 2, an internal configuration of the video game device 10 will be described.

Referring to FIG. 2, a CPU core 21 is mounted on an electronic circuit board 20 accommodated in the housing 13. The CPU core 21 is connected to a connector 23, an input/output interface circuit (referred to simply as an "I/F circuit") 25, a first GPU (Graphics Processing Unit) 26, a second GPU 27, a RAM 24 and an LCD controller 31, via a bus 22. The connector 23 can receive the memory card 17. The memory card 17 includes therein a ROM 17*a* storing a video game program, and a RAM 17*b* rewritably storing backup data. The video game program stored in the ROM 17*a* of the memory card 17 is loaded to the RAM 24, and the loaded video game program is executed by the CPU core 21. In addition to the video game program, the RAM 24 also stores temporary data produced while the CPU core 21 is running the video game program, and other data for producing game images. The I/F circuit 25 is connected to the touch panel 15, a right speaker 30*a*, a left speaker 30*b*, and a control switch section 14 of FIG. 1 including the cross-shaped switch 14*a*, the A button 14*d*, etc. The right speaker 30*a* and the left speaker 30*b* are placed behind the sound slits 18*a* and 18*b*, respectively.

A first VRAM (Video RAM) 28 is connected to the first GPU 26, and a second VRAM 29 is connected to the second GPU 27. In response to an instruction from the CPU core 21, the first GPU 26 produces a first game image and renders it on the first VRAM 28, based on data stored in the RAM 24 for producing game images. Similarly, the second GPU 27 produces a second game image and renders it on the second VRAM 29 in response to an instruction from the CPU core 21. The first VRAM 28 and the second VRAM 29 are connected to the LCD controller 31.

The LCD controller 31 includes a register 32. The register 32 stores a value of 0 or 1 in response to an instruction from the CPU core 21. When the value stored in the register 32 is 0, the LCD controller 31 outputs the first game image rendered on the first VRAM 28 to the first LCD 11 and outputs the second game image rendered on the second VRAM 29 to the second LCD 12. When the value stored in the register 32 is 1, the LCD controller 31 outputs the first game image rendered on the first VRAM 28 to the second LCD 12 and outputs the second game image rendered on the second VRAM 29 to the first LCD 11.

The configuration of the video game device 10 described above is merely an example, and the present invention is applicable to any computer system having at least one display device. The video game program of example embodiments of the present invention may be supplied to the computer system via a wired or wireless communications line, instead of via an external storage medium such as the memory card 17. Alternatively, the video game program may be pre-stored in a non-volatile storage device inside the computer system.

The flow of the game process to be performed by the video game device 10 will now be described. While the example embodiments of the present invention is herein applied to a role-playing game, it may also be applicable to other genres of video games, such as simulation games.

There are a plurality of player characters (those that the player can control) in the game world, and the player can choose four of the player characters, for example, to form a party. The player can control the party to take down enemy characters in the game world.

The player characters and enemy characters in the game world are each assigned a predetermined attribute, selected from "fire", "wood", "earth", "wind" and "water". These attributes are defined so that each attribute is weak to one of the other attributes but is strong against another one of the other attributes. For example, a character of the "fire" attribute may be weak to a character of the "water" attribute but strong against a character of the "wood" attribute. If the player can form a party while taking into consideration the attributes of enemy characters that the party will likely to encounter in due course of time, it will affect the game in favor of the player. For example, when the party is traveling through a forest, it is expected that the party will encounter enemy characters mostly of the wood attribute. Therefore, the party can travel through the forest more easily if the party includes characters of the fire attribute, who are strong against enemy characters of the wood attribute.

The game proceeds in the traveling mode and in the battle mode alternated with each other. In the traveling mode, the player can control the party to move the party around to an intended destination in the game field. While the party is traveling across the game field, an enemy-encountering event occurs at random, triggering the battle mode. When the enemy character is taken down, the battle mode ends and the process returns to the traveling mode.

FIG. 3 shows an exemplary game screen in the traveling mode. An attribute status barometer image is displayed on the first LCD 11. The attribute status barometer image shows, for each attribute, whether the attribute is currently being active and, if the attribute is not being active, the amount of time needed before the attribute will next become active (which may be an approximate representation of the time).

In the present embodiment, the attribute status barometer image includes a "fire" planet 40a, a "wood" planet 40b, an "earth" planet 40c, a "wind" planet 40d and a "water" planet 40e, which are attribute symbols representing the five attributes of "fire", "wood", "earth", "wind" and "water", respectively. There is provided an animation of these planets moving in concentric orbital motion around the center of the display screen of the first LCD 11. Each arrow in the figure represents the moving direction of a planet. The planets travel at an equal velocity but have different orbital periods. The orbital periods of the "fire" planet 40a, the "wood" planet 40b, the "earth" planet 40c, the "wind" planet 40d and the "water" planet 40e are 10 minutes, 20 minutes, 40 minutes, 80 minutes and 120 minutes, respectively.

Referring to FIG. 3, drawn in the background of the attribute status barometer image are the orbit of each attribute symbol, the arrow representing the moving direction thereof, and boundary lines separating the active zone of each attribute from others. The orbit of each attribute symbol and the arrow representing the moving direction thereof are optional. The boundary lines are also not necessary if the active zones of different attributes are displayed in different colors. While an attribute symbol is moving through its active zone, the status of the attribute represented by the attribute symbol becomes active. For example, in the example shown in FIG. 3, the "wood" planet 40b is moving through the "wood" active zone, and therefore the status of the "wood" attribute is active. Similarly, the "water" planet 40e is moving through the "water" active zone, and therefore the status of the "water" attribute is active. The other ("fire", "earth", "wind") planets are moving outside their active zones, and are therefore inactive. The attribute being active affects the attribute ("space attribute") of a particular space in the game world (at least around the player characters and enemy characters facing each other). For example, while the "wind" attribute is active, the space attribute is "wind". In the example shown in FIG. 3, the "wood" attribute and the "water" attribute are active, whereby the space attribute is "wood/water". The space attribute affects the ability parameters of characters of the same attribute. For example, where the space attribute is "wood/water", the attack power of each player character whose attribute is "wood" or "water" is temporarily doubled.

Displayed on the second LCD 12 are the field of the game world and the party traveling across the field. The party is made up of four characters, i.e., a first character 41a, a second character 41b, a third character 41c, and a fourth character 41d. Assume that the attribute of the first character 41a is "fire". The player can operate the cross-shaped switch 14a to move the party around to an intended destination.

Figure 4:
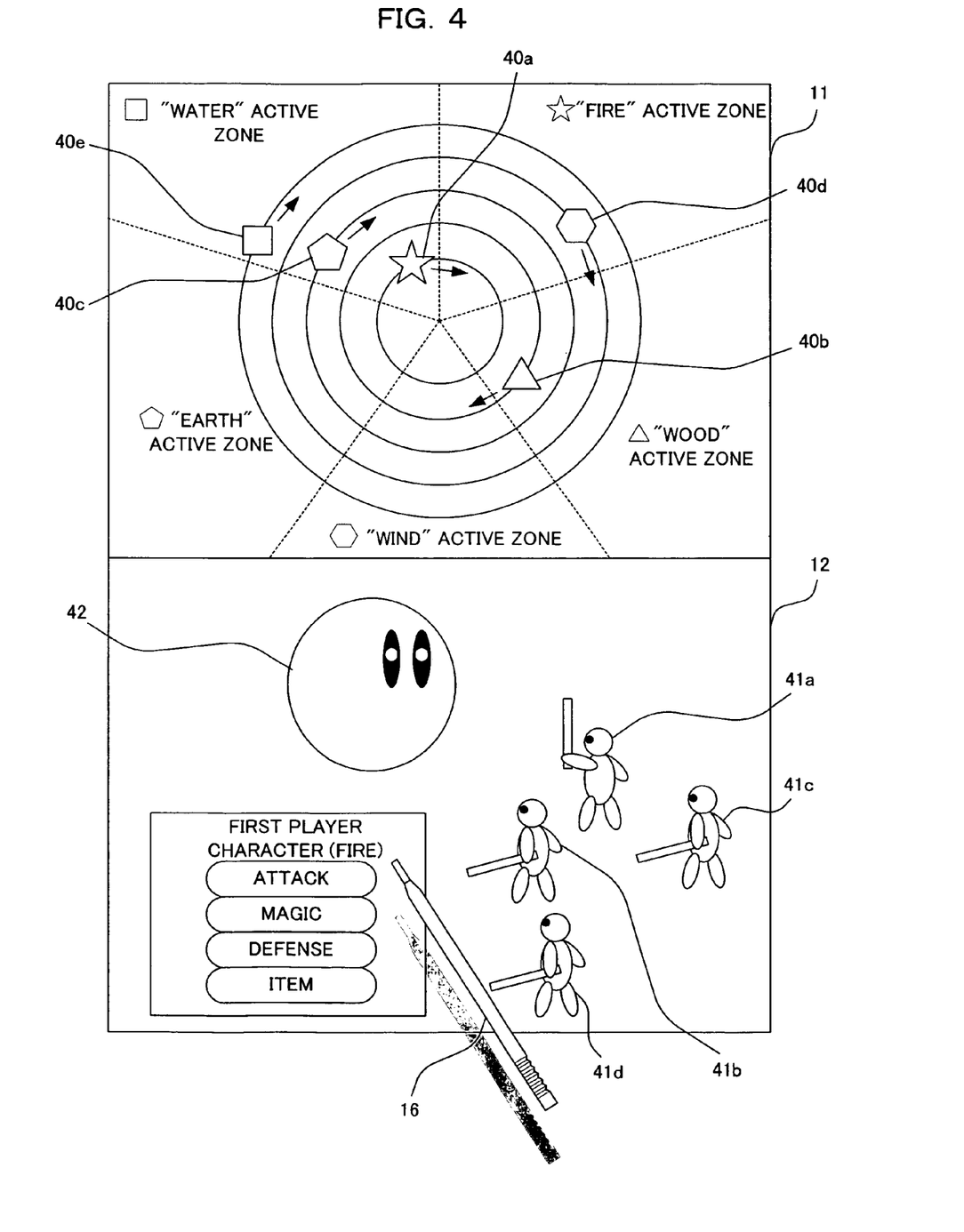
FIG. 4 shows an exemplary game screen in the battle mode.

If the party encounters an enemy character in the state of FIG. 3, the mode of operation transitions from the traveling mode to the battle mode, and a game image as shown in FIG. 4 is displayed. Note that the attribute status barometer image on the first LCD 11 is generally the same as that shown in FIG. 3 since hardly any time has passed since FIG. 3.

The second LCD 12 shows the player characters 41a to 41d facing an enemy character 42. Characters, including the player characters 41a to 41d and the enemy character 42, are each assigned an "agility" parameter, and a character with high "agility" is first given an opportunity to take an action in the battle mode. When any of the player characters 41a to 41d is given an opportunity to take an action, a command list is displayed with which the player can issue an instruction to the player character. When the player selects a command from the command list, there is provided an animation of the player character taking an action according to the selected command. In the example shown in FIG. 4, a command list for giving an instruction to the first player character 41a is displayed. While the attribute of the first player character 41a is "fire", the attribute status barometer image indicates that the "fire" planet 40a is located outside the "fire" active zone and the status of the "fire" attribute is thus being inactive. The attribute status barometer image also indicates that the "fire" planet 40a will soon enter the "fire" active zone. In view of this, the player can wait for some tens of seconds, for example, to thereby let the "fire" planet 40a enter the "fire" active zone before touching on "fight" with the stylus 16. Then, the player successively issues instructions to the remaining player characters 41b to 41d. Since the attribute status barometer image indicates that it will take some time for the "earth" planet 40c to enter the "earth" active zone, it may be more effective for the player to instruct any player character of the "earth" attribute to, instead of attacking the enemy character 42, cast a spell to restore hit points to other player characters or to defend other player characters. Alternatively, the player may reform the party by replacing the player character of the "earth" attribute with another player character of the "water" attribute.

Note that the movement of the planets 40a to 40e may be temporarily halted (i.e., the time in the game world stops temporarily) while a command list is being displayed. Even then, the planets 40a to 40e are moved during each battle animation. In such a case, the player can leave the player characters 41a to 41d standing in the game field in the traveling mode until an intended planet becomes active. Then, after the intended planet becomes active, the player can start moving the party so that the party can enter the battle mode while an intended attribute is being active.

Figure 5:
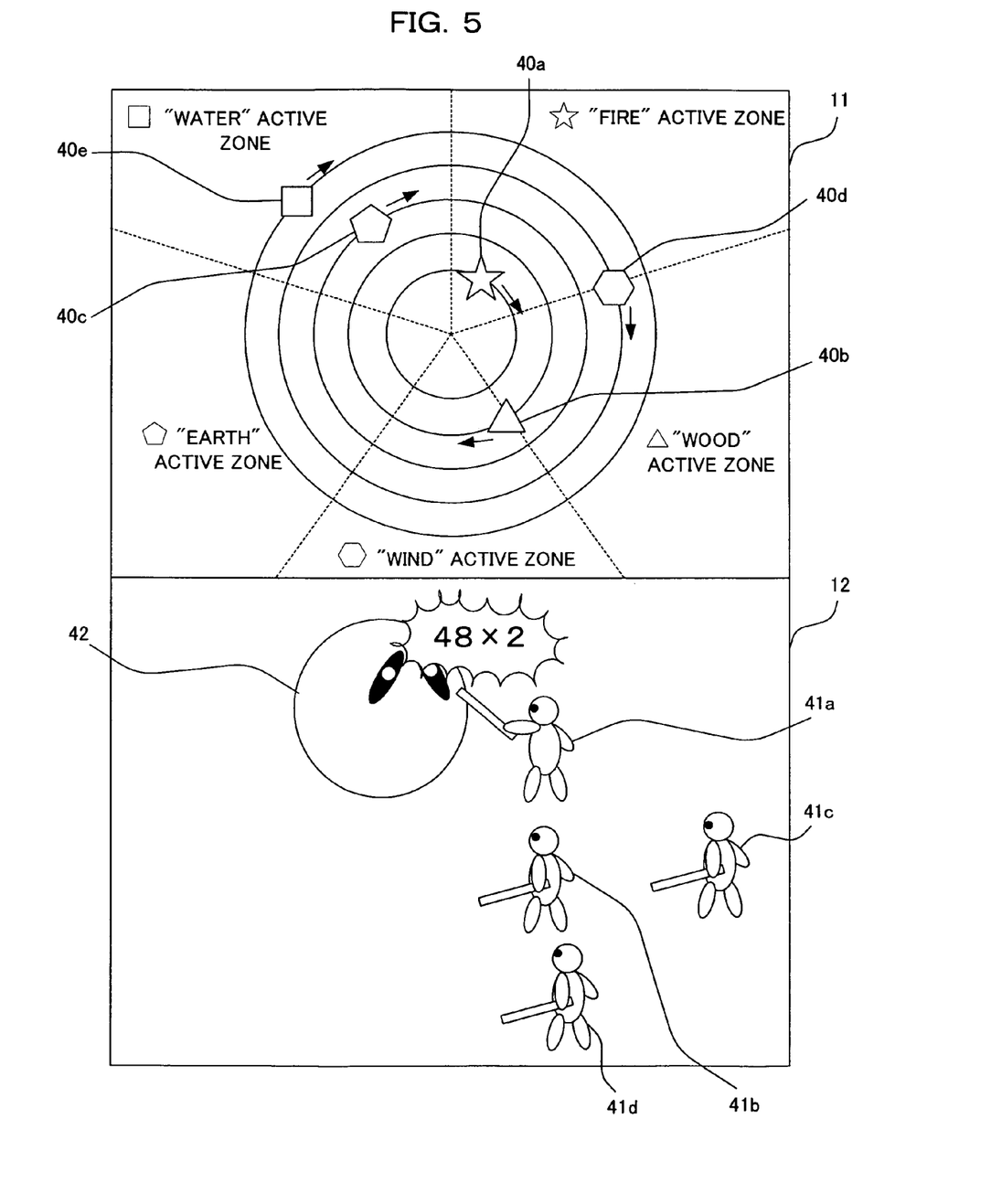
FIG. 5 shows another exemplary game screen in the battle mode.

FIG. 5 shows an exemplary game screen at a point in time when an attack by the first player character 41a hits the enemy character 42. While the first player character 41a can normally inflict 48 damage points on the enemy character 42, the first player character 41a inflicts 48×2=96 damage points on the enemy character 42 because the "fire" attribute is being active and therefore the attack power of the first player character 41a of the "fire" attribute is being doubled. The calculation of damage points also takes into account the attribute of the enemy character with respect to the attribute of the player character as described above. For example, a character of the "fire" attribute can give a character of the "wood" attribute a damage that is twice as much as a normal damage. Therefore, if the attribute of the enemy character 42 is "wood", and if the first player character 41a successfully attacks the enemy character 42 while the space attribute includes "fire", the damage points will be 48×2×2=192. On the other hand, a character of the "fire" attribute can give a character of the "water" attribute a damage that is only ½ a normal damage. Therefore, if the attribute of the enemy character 42 is "water", and if the first player character 41a successfully attacks the enemy character 42 while the space attribute includes "fire", the damage points will be 48×2/2=48.

The operation of the video game device 10 will now be described in detail.

Figure 6:
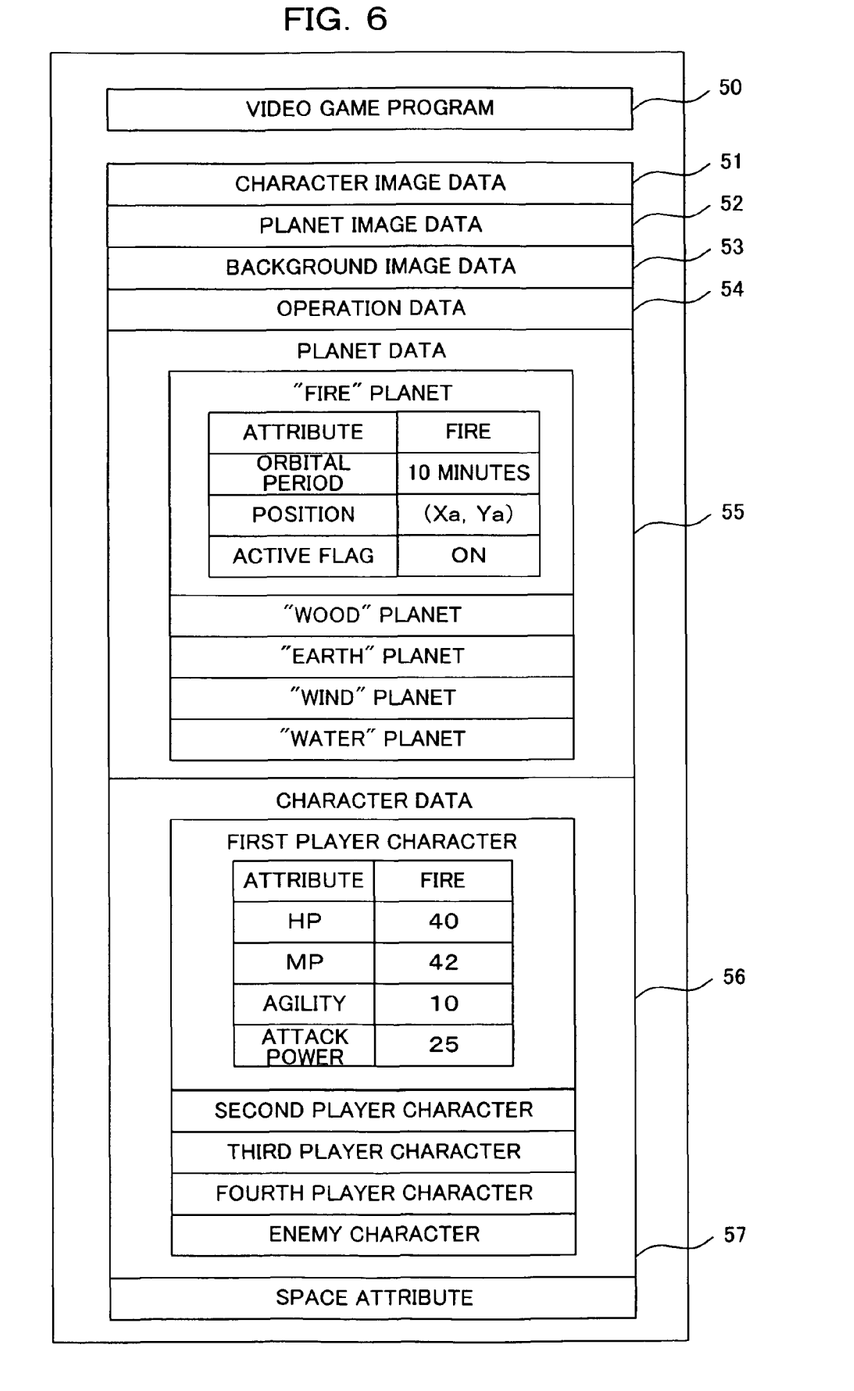
FIG. 6 shows a memory map of the RAM 24.

FIG. 6 shows an exemplary memory map of the RAM 24. The RAM 24 stores a video game program 50, character image data 51, planet image data 52, background image data 53, operation data 54, planet data 55, character data 56 and a space attribute 57.

The video game program 50 is loaded from the ROM 17a of the memory card 17 to the RAM 24, and the loaded video game program is executed by the CPU core 21.

The character image data 51 are image data of player characters and enemy characters. The planet image data 52 are image data of the planets included in the attribute status barometer image. The background image data 53 are image data of the background of the attribute status barometer image, and the background of the game field in the traveling mode, etc. The operation data 54 is data representing an input operation by the player, and is periodically obtained based on the output signals from the control switch section 14 and the touch panel 15. The planet data 55 are data regarding the planets, and each planet data 55 includes the attribute of the planet, the orbital period thereof, the position thereof, and the active flag thereof as shown in FIG. 6. The active flag indicates whether or not the status of the planet is being active. The character data 56 are data regarding player characters and enemy characters. Referring to FIG. 6, each character data 56 represents the attribute of the character and other ability parameters thereof, including HP (hit points) representing the number of damage points that can be taken by the character, the magic points ("MP") representing how many spells that can be cast by the character, the agility, and the attack power. The types of ability parameters are not limited to those shown above. The character data 56 may include other ability parameters such as special skills of the character, the number of times the character can attack enemy consecutively, etc. The space attribute 57 is constantly updated based on the statuses of the attributes "fire", "wood", "earth", "wind" and "water".

The flow of the process of the CPU core 21 according to the video game program 50 will now be described with reference to the flow charts of FIGS. 7 to 9.

The process of the CPU core 21 is generally classified into the space attribute process and the character process. The space attribute process is a process primarily for displaying the attribute status barometer image. The character process is a process for handling the travel of player characters in the traveling mode and battles between player characters and enemy characters in the battle mode. In the present embodiment, the space attribute process and the character process are performed by the CPU core 21 in parallel to each other. Note however that the present invention is not limited thereto, and the programming method is not limited to any particular method as long as the effects of the present invention are realized.

Figure 7:
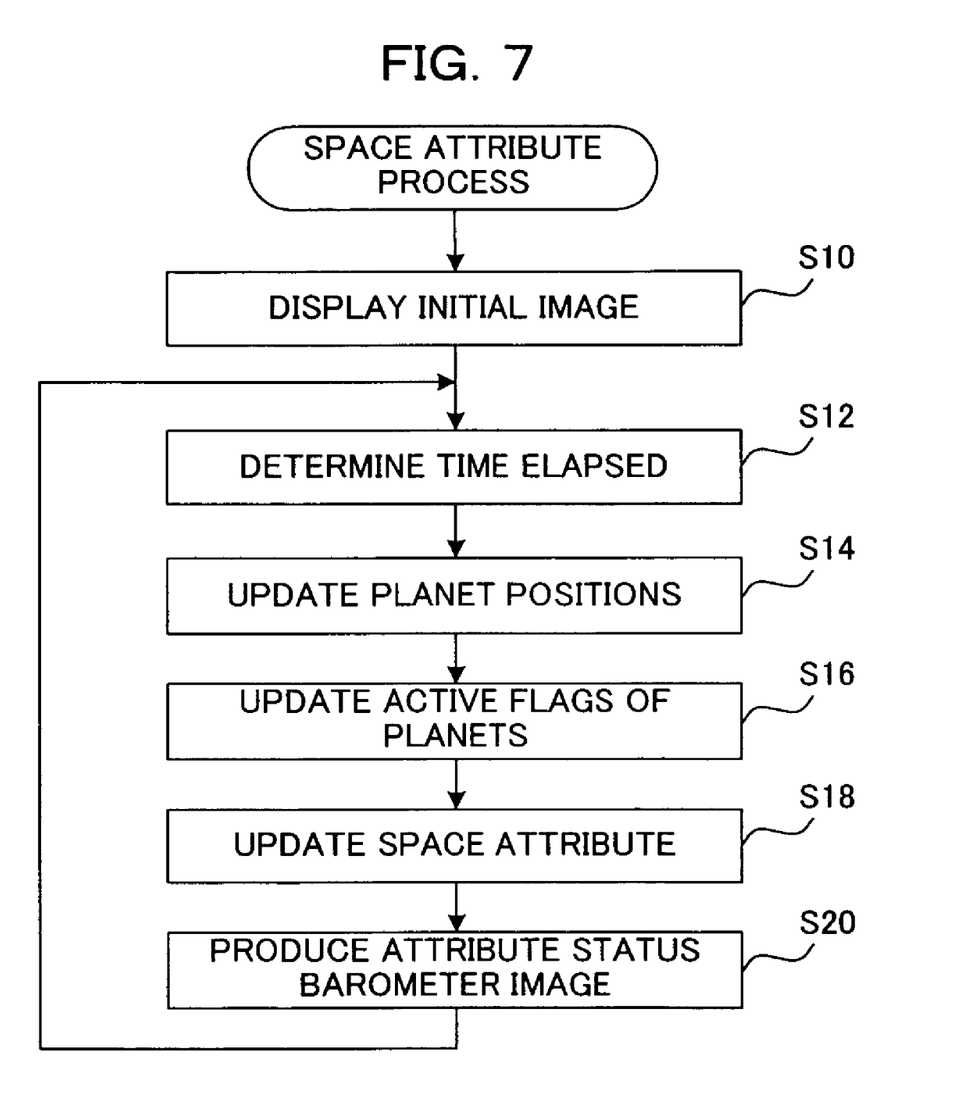
FIG. 7 is a flow chart showing the flow of a space attribute process.

Referring first to FIG. 7, the details of the space attribute process will be described.

After the video game program 50 starts, the CPU core 21 displays the attribute status barometer image in its initial state on the first LCD 11 in step S10 of FIG. 7. In the initial state, the planets are placed in their initial positions.

In step S12, the CPU core 21 determines the amount of time elapsed from the start of the video game program 50.

In step S14, the CPU core 21 calculates the current position of each planet based on the elapsed time determined in step S12 and the orbital period of the planet, and updates the positions of the planets 40a to 40e stored in the RAM 24 based on the calculation results.

In step S16, the CPU core 21 determines whether or not the position of each of the planets 40a to 40e is within the corresponding active zone, and updates the active flags of the planets 40a to 40e stored in the RAM 24 based on the determination results.

In step S18, the CPU core 21 refers to the attribute of each planet whose active flag is ON (i.e., each planet that is being active) to update the space attribute 57 stored in the RAM 24.

In step S20, the CPU core 21 produces the attribute status barometer image using the planet image data 52 and the background image data 53, based on the positions of the planets 40a to 40e stored in the RAM 24. The produced attribute status barometer image is stored in the first VRAM 28 as image data. Then, at a predetermined point in time, the attribute status barometer image is supplied to the first LCD 11 through the LCD controller 31, and is displayed on screen of the first LCD 11.

After step S20, the process returns to step S12 to repeat the loop from steps S12 to S20.

With the space attribute process as described above, the space attribute 57 stored in the RAM 24 is updated in real time.

Figure 8:
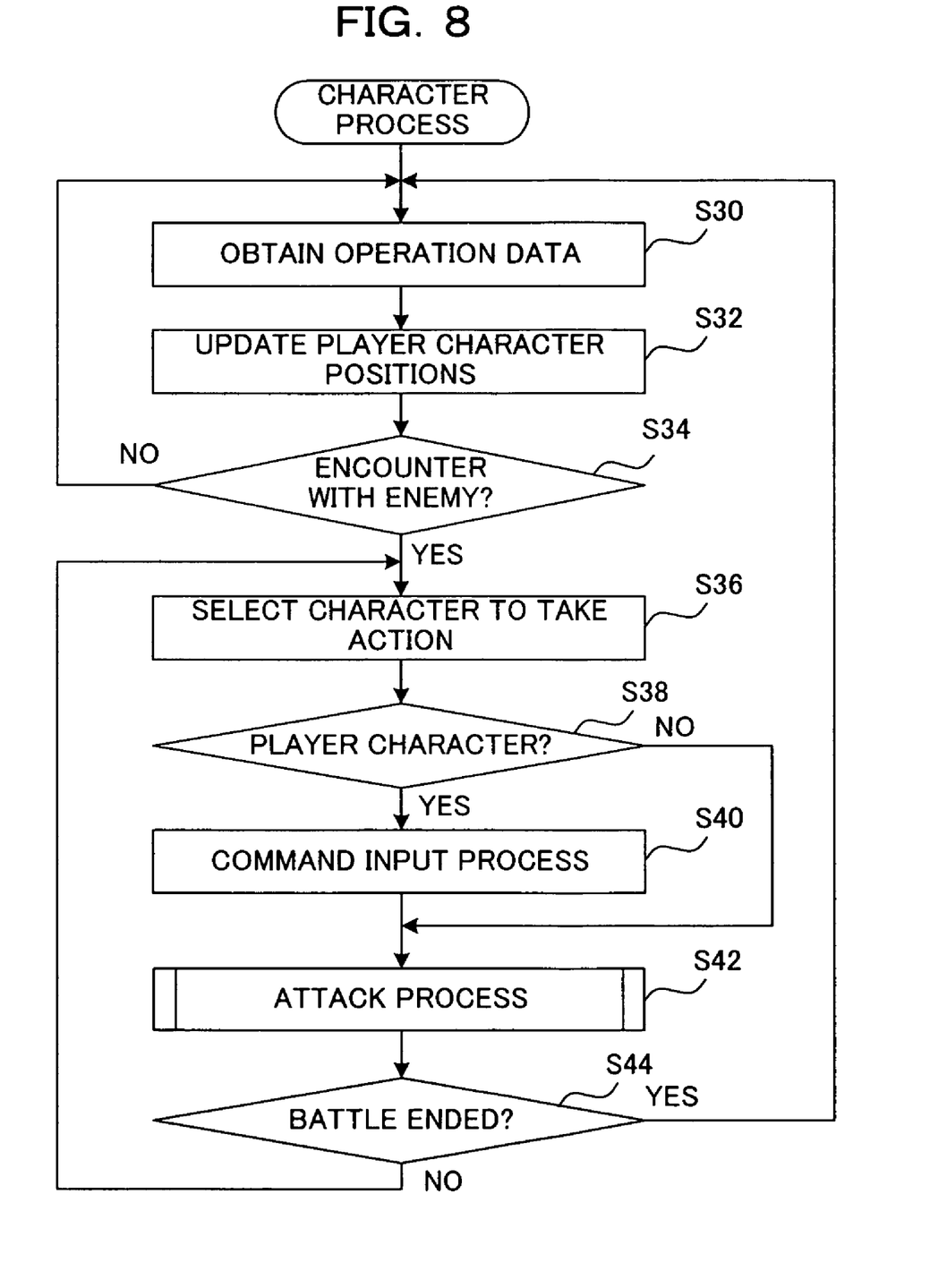
FIG. 8 is a flow chart showing the flow of a character process.
Figure 9:
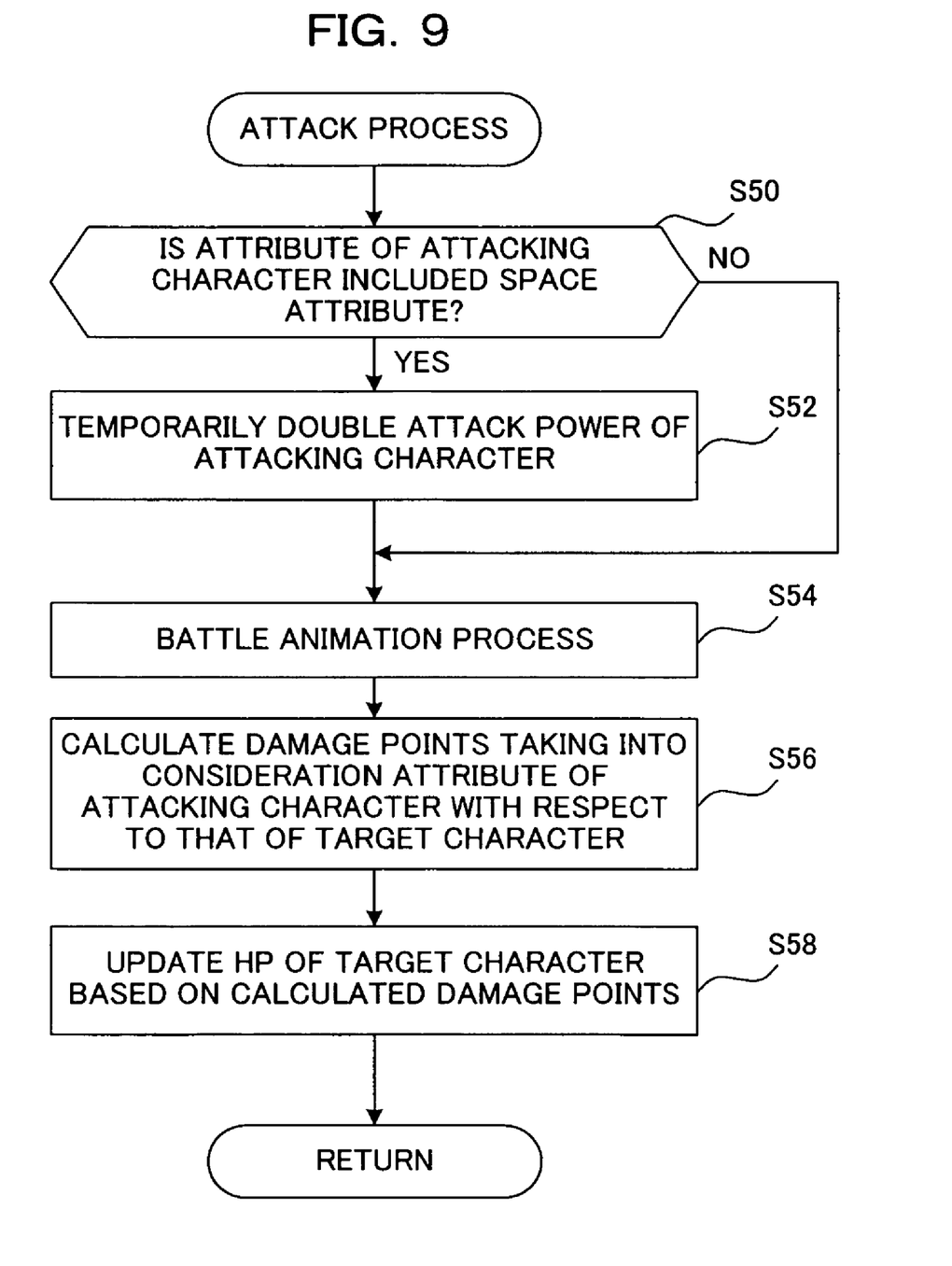
FIG. 9 is a flow chart showing the flow of a attack process.

Referring now to FIG. 8, the details of the character process will be described. Also in the character process, the game image is periodically produced and displayed on the second LCD 12, as in the space attribute process. However, for the sake of simplicity, the game image producing process is omitted in the flow chart of FIG. 8 (and in the flow chart of FIG. 9 showing a part of the process of FIG. 8).

As the video game program 50 is started, a game starts first in the traveling mode, and the CPU core 21 obtains the operation data 54 in step S30 of FIG. 8.

In step S32, the CPU core 21 updates the positions of the player characters 41a to 41d stored in the RAM 24 according to the operation data 54 obtained in step S30.

In the traveling mode, the CPU core 21 produces a game image based on the updated positions of the player characters using the character image data 51 and the background image data 53, wherein the game image represents the player characters 41a to 41d traveling across the game field as shown in FIG. 3. The produced game image is displayed on the second LCD 12.

In step S34, the CPU core 21 determines whether or not the party has encountered the enemy character 42. If so, the process proceeds to step S36 to transition from the traveling mode to the battle mode. Otherwise, the process returns to step S30.

In step S36, the CPU core 21 selects the first character to take an action based on the agility levels of the characters involved, including the player characters 41a to 41d and the enemy character 42.

In step S38, the CPU core 21 determines whether or not the character selected in step S36 is a player character. If so, the process proceeds to step S40, and the process proceeds to step S42 otherwise.

In step S40, the CPU core 21 prompts the player to input an instruction to the player character as shown in FIG. 4.

In step S42, the CPU core 21 performs an attack process. The details of the attack process will be described later.

In step S44, the CPU core 21 determines whether or not the battle has ended. If so, the process proceeds to step S30 to transition from the battle mode back to the traveling mode. Otherwise, the process returns to step S36 to select the next character to take an action.

Even during the character process, the space attribute process is being performed in parallel. Therefore, whether in the traveling mode or in the battle mode, the space attribute 57 is constantly updated based on the movement of the planets 40a to 40e. As described above, the movement of the planets 40a to 40e may be temporarily halted while a command list is being displayed. In such a case, the movement of the planets 40a to 40e needs to be halted temporarily in step S40.

Referring now to the flow chart of FIG. 9, the details of the attack process in step S38 of FIG. 8 will be described.

First, in step S50, the CPU core 21 refers to data stored in the RAM 24 to determine whether or not the attribute of the attacking character (a player character or an enemy character) is included in the space attribute 57. If so, the process proceeds to step S52, and the process proceeds to step S54 otherwise.

In step S52, the CPU core 21 temporarily doubles the attack power of the attacking character, which is stored in the RAM 24.

In step S54, the CPU core 21 provides an animation of the attacking character attacking the target character.

In step S56, the CPU core 21 calculates the damage points to be inflicted on the target character while taking into consideration the attack power of the attacking character, and also taking into consideration the attribute of the attacking character with respect to the attribute of the target character. If the attack power of the attacking character has been temporarily doubled in step S52, the damage points to be inflicted on the target character is twice as many as the normal damage points.

In step S58, the CPU core 21 subtracts the damage points calculated in step S56 from the HP of the target character stored in the RAM 24, and exits the attack process.

As described above, in the present embodiment, the space attribute, which affects the attack power of each character, changes in real time. This enriches the strategic aspect of the present video game in the battle mode. The player can look at the attribute status barometer image to perceive the amount of time needed before an attribute will next become active, based on which the player can make a strategic decision, e.g., a decision to remain still in view of the space attribute being about to switch to an intended attribute. This enriches the strategic aspect of the present video game.

While an attribute status barometer image as shown in FIG. 3 is used in the present embodiment, the present invention is not limited to this, but may use any other suitable image as long as the image can indicate the status of each attribute (active or inactive) and can also generally indicate the amount of time needed before each inactive attribute will next become active. Three variations of the attribute status barometer image will be shown below.

The attribute status barometer image of FIG. 10 differs from that of FIG. 3 in that there is only one common active zone for the planets 40a to 40e. With this attribute status barometer image, similar effects to those described above will be obtained. However, it may be more preferred to provide an active zone for each planet at a different position as in the embodiment above, which can enhance the playability of the video game, as the player will be then prevented from too easily determining, at a glance, which attribute is currently being active and about when an inactive attribute will become active.

Figure 11:
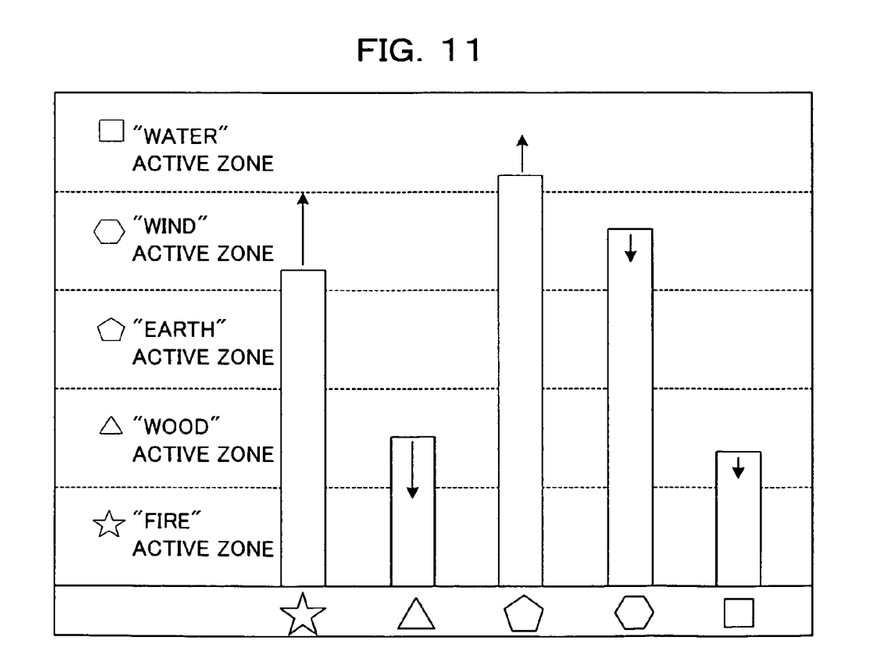
FIG. 11 shows another variation of an attribute status barometer image.

The attribute status barometer image of FIG. 11 includes, instead of the planets 40a to 40e, bars each associated with one attribute, wherein the top of each bar moves up and down between minimum and maximum values. For example, the "fire" attribute is being active while the top of the "fire" bar is located within the "fire" active zone. In the example shown in FIG. 11, the "wood" and "wind" attributes are being active, and the space attribute is therefore "wood/wind". The speed of bar movement may be the same for all the attributes or may be different from one attribute to another.

Figure 12:
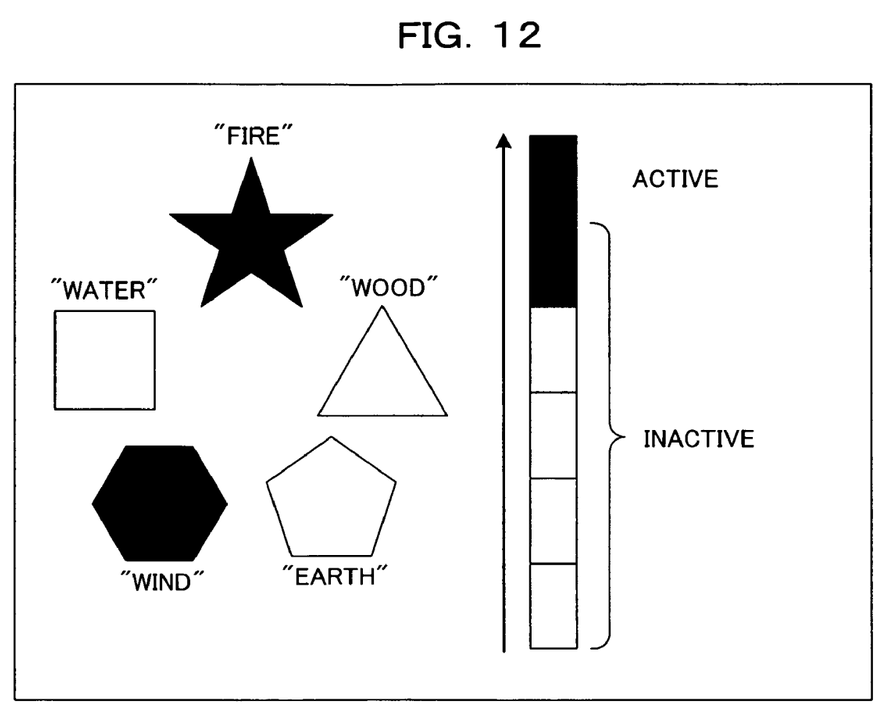
FIG. 12 shows still another variation of an attribute status barometer image.

The attribute status barometer image of FIG. 12 includes symbols each associated with one attribute, wherein the color of each attribute symbol changes through six steps, from the lightest color to the darkest color. A symbol in the darkest color means that the associated attribute is being active. After an attribute finishes being active, the color for that attribute changes to the lightest color. Then, the color again starts darkening gradually over time.

While the example embodiments of the present invention are herein applied to a role-playing game, it may also be applicable to other genres of video games, such as simulation games.

While the planets have different orbital periods in the present embodiment, the present invention is not limited thereto, and the planets may all have the same orbital period. Note however that the order in which different attributes become active will then be fixed, whereby the pattern in which the space attribute changes will be monotonous as compared with the present embodiment.

The velocity of each planet may be constant or may be varied over time. The velocity may be increased or decreased in response to an event occurring in the game world (e.g., a player character casting a predetermined spell).

While the space attribute can include a plurality of attributes if they are being active in the present embodiment, the present invention is not limited thereto. For example, one of a plurality of attributes being active may be selected to be the space attribute based on a predetermined criterion (e.g., the attribute that has become active at the latest point in time).

Where barometer images for different attributes are moving independently in the attribute status barometer image (e.g., where different planets are moving with different orbital periods), there may be a point in time at which the barometer images are positionally aligned together (e.g., the planets may be all lined up). A special event may occur in the game when such an alignment happens. For example, an event may happen where player and enemy characters are both damaged, which may enhance the playability of the video game. Moreover, there may be a magic spell that has an effect of advancing a particular barometer image by a predetermined distance (e.g., a magic spell by which a planet traveling along its orbit at a constant velocity is advanced by a predetermined distance). Then, the player may be able to intentionally align the positions of the barometer images (e.g., to intentionally line up all the planets). A special event (e.g., giving an extra damage to an enemy character) may occur upon such intentional alignment, which may further enhance the playability of the video game.

While the example embodiments of the invention have been described in detail, the foregoing description is in all aspects illustrative and not restrictive. It is understood that numerous other modifications and variations can be devised without departing from the scope of the invention.

What is claimed is:

1. A non-transitory computer-readable physical storage medium having tangibly recorded thereon a video game program to be executed by a video game device including a display, control programmed logic circuitry and computer readable storage memory, the video game program instructing a computer of the video game device to function as:
   attribute status changing programmed logic circuitry for automatically switching a status of each of a plurality of types of attributes in a predetermined way, which are respectively assigned to a plurality of characters in a game world, between active and inactive in real time and for storing the status of each attribute in the computer readable storage memory;
   attribute status display control programmed logic circuitry for producing an attribute status barometer image and displaying the attribute status barometer image on the display, wherein the attribute status barometer image represents whether or not a status of each attribute is currently being active and an amount of time needed before an inactive attribute will next become active;
   space attribute determining programmed logic circuitry for storing, in the computer readable storage memory, an attribute currently being active as a space attribute;
   attribute comparison programmed logic circuitry for comparing an attribute of each of the plurality of characters with the space attribute;
   character ability changing programmed logic circuitry for changing an ability parameter of each of the plurality of characters based on a result of the comparison by the attribute comparison programmed logic circuitry; and
   game process programmed logic circuitry for performing a game process using the ability parameter, which has been changed by the character ability changing programmed logic circuitry, based on an instruction inputted by a player through the control programmed logic circuitry.

2. The non-transitory computer-readable physical storage medium according to claim 1, wherein a period by which the status of each attribute is switched by the attribute status changing from inactive to active is different from one attribute to another.

3. The non-transitory computer-readable physical storage medium according to claim 1, wherein the attribute status display control produces the attribute status barometer image and displays the attribute status barometer image on the display, wherein the attribute status barometer image represents whether or not a status of each attribute is currently being active and an amount of time needed before an inactive attribute will next become active, in terms of positions at which attribute symbols each associated with one attribute are displayed.

4. The non-transitory computer-readable physical storage medium according to claim 3, wherein the attribute status display control produces the attribute status barometer image and displays the attribute status barometer image on the display, wherein each attribute symbol moves so that the attribute symbol is located within an active zone while a status of the attribute associated with the attribute symbol is being active.

5. The non-transitory computer-readable physical storage medium according to claim 4, wherein:
   a position of the active zone is different for each attribute symbol; and
   the attribute status display control produces the status barometer image and displays the attribute status barometer image on the display, wherein each attribute symbol moves so that the attribute symbol is located within an active zone for the attribute symbol while a status of the attribute associated with the attribute symbol is being active whereas the attribute symbol is located within an active zone for another attribute symbol while the status of the attribute associated with the attribute symbol is being inactive.

6. The non-transitory computer-readable physical storage medium according to claim 1, wherein:
   the game processing performs a game process in which a plurality of characters, including a player character and an enemy character, are involved in a battle against each other;
   the character ability changing changes an ability parameter of each character so as to increase an attack power of the character based on a result of the comparison by the attribute comparison;
   the attribute comparison compares an attribute of each character with the space attribute determined by the space attribute determining; and
   the character ability changing changes an ability parameter of each character so as to increase an attack power of the character if the attribute of the character corresponds to the space attribute based on a result of the comparison by the attribute comparison.

7. A video game device, comprising:
   a display for displaying a game image;
   control programmed logic circuitry to be controlled by a player;
   computer readable storage memory for storing data for a game process;
   attribute status changing programmed logic circuitry for automatically switching a status of each of a plurality of types of attributes in a predetermined way, which are respectively assigned to a plurality of characters in a game world, between active and inactive in real time and for storing the status of each attribute in the computer readable storage memory;
   attribute status display control programmed logic circuitry for producing an attribute status barometer image and displaying the attribute status barometer image on the display, wherein the attribute status barometer image represents whether or not a status of each attribute is currently being active and an amount of time needed before an inactive attribute will next become active;
   space attribute determining programmed logic circuitry for storing, in the computer readable storage memory, an attribute currently being active as a space attribute;
   attribute comparison programmed logic circuitry for comparing an attribute of each of the plurality of characters with the space attribute;
   character ability changing programmed logic circuitry for changing an ability parameter of each of the plurality of characters based on a result of the comparison by the attribute comparison programmed logic circuitry; and
   game process programmed logic circuitry for performing a game process using the ability parameter, which has been changed by the character ability changing programmed logic circuitry, based on an instruction inputted by a player through the control programmed logic circuitry.

8. The video game device according to claim 7, wherein:
the game process programmed logic circuitry performs a game process in which a plurality of characters, including a player character and an enemy character, are involved in a battle against each other;
the character ability changing programmed logic circuitry changes an ability parameter of each character so as to increase an attack power of the character based on a result of the comparison by the attribute comparison programmed logic circuitry;
the attribute comparison programmed logic circuitry compares an attribute of each character with the space attribute determined by the space attribute determining programmed logic circuitry; and
the character ability changing programmed logic circuitry changes an ability parameter of each character so as to increase an attack power of the character if an attribute of the character corresponds to the space attribute based on a result of the comparison by the attribute comparison programmed logic circuitry.

9. The video game device according to claim 7, wherein a period by which the status of each attribute is switched by the attribute status changing programmed logic circuitry from inactive to active is different from one attribute to another.

10. The video game device according to claim 7, wherein the attribute status display control programmed logic circuitry produces the attribute status barometer image and displays the attribute status barometer image on the display, wherein the attribute status barometer image represents whether or not a status of each attribute is currently being active and an amount of time needed before an inactive attribute will next become active, in terms of positions at which attribute symbols each associated with one attribute are displayed.

11. The video game device according to claim 10, wherein the attribute status display control programmed logic circuitry produces the attribute status barometer image and displays the attribute status barometer image on the display, wherein each attribute symbol moves so that the attribute symbol is located within an active zone while a status of the attribute associated with the attribute symbol is being active.

12. The video game device according to claim 11, wherein:
a position of the active zone is different for each attribute symbol; and
the attribute status display control programmed logic circuitry produces the status barometer image and displays the attribute status barometer image on the display, wherein each attribute symbol moves so that the attribute symbol is located within an active zone for the attribute symbol while a status of the attribute associated with the attribute symbol is being active whereas the attribute symbol is located within an active zone for another attribute symbol while the status of the attribute associated with the attribute symbol is being inactive.

13. The video game device according to claim 7, wherein each of the attributes is weak to one of the other attributes but is strong against another one of the other attributes.

14. The video game device according to claim 13, wherein the attributes include a fire attribute, a water attribute and a wood attribute.

15. The non-transitory computer-readable physical storage medium according to claim 1, wherein each of the attributes is weak to one of the other attributes but is strong against another one of the other attributes.

16. The non-transitory computer-readable physical storage medium according to claim 15, wherein the attributes include a fire attribute, a water attribute and a wood attribute.

17. A computer implemented method executed by a video game device, the method comprising:
automatically switching a status of each of a plurality of types of attributes in a predetermined way, which are respectively assigned to a plurality of characters in a game world, between active and inactive in real time and storing the status of each attribute in a computer readable storage medium;
producing an attribute status barometer image and displaying the attribute status barometer image on a display, wherein the attribute status barometer image represents whether or not a status of each attribute is currently being active and an amount of time needed before an inactive attribute will next become active;
storing an attribute currently being active as a space attribute in the computer readable storage medium;
comparing an attribute of each of the plurality of characters with the space attribute;
changing an ability parameter of each of the plurality of characters based on a result of the comparison of the attribute of the character in the game world with the space attribute;
receiving an instruction input from a player on the video game device; and
performing a game process using the changed ability parameter based on the received instruction.

18. The method according to claim 17, wherein a period by which the status of each attribute is switched from inactive to active is different from one attribute to another.

19. The method according to claim 17, wherein the attribute status barometer image represents whether or not a status of each attribute is currently being active and an amount of time needed before an inactive attribute will next become active, in terms of positions at which attribute symbols each associated with one attribute are displayed.

20. The method according to claim 19, wherein each attribute symbol moves so that the attribute symbol is located within an active zone while a status of the attribute associated with the attribute symbol is being active.

21. The method according to claim 20, wherein:
a position of the active zone is different for each attribute symbol; and
wherein each attribute symbol moves so that the attribute symbol is located within an active zone for the attribute symbol while a status of the attribute associated with the attribute symbol is being active whereas the attribute symbol is located within an active zone for another attribute symbol while the status of the attribute associated with the attribute symbol is being inactive.

22. The method according to claim 17, wherein:
the game process involves a plurality of characters, including a player character and an enemy character, in a battle against each other;
an ability parameter of each character is changed so as to increase an attack power of the character based on a result of the comparison of the attribute of the character in the game world with the determined space attribute;
an attribute of each character is compared with the determined space attribute; and
an ability parameter of each character is changed so as to increase an attack power of the character if the attribute of the character corresponds to the space attribute based on a result of the comparison of the attribute of each character is compared with the determined space attribute.

23. The method according to claim 17, wherein each of the attributes is weak to one of the other attributes but is strong against another one of the other attributes.

24. The method according to claim 23, wherein the attributes include a fire attribute, a water attribute and a wood attribute.

* * * * *